US009856927B2

(12) United States Patent
Reimchen

(10) Patent No.: US 9,856,927 B2
(45) Date of Patent: Jan. 2, 2018

(54) RETURN STOP AND TRANSFER CASE WITH SUCH A RETURN STOP

(71) Applicant: Schaeffler Technologies AG & Co. KG, Herzogenaurach (DE)

(72) Inventor: Alexander Reimchen, Herzogenaurach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/989,161

(22) Filed: Jan. 6, 2016

(65) Prior Publication Data

US 2016/0215826 A1 Jul. 28, 2016

(30) Foreign Application Priority Data

Jan. 28, 2015 (DE) ......................... 10 2015 201 403

(51) Int. Cl.
| | |
|---|---|
| *F16D 41/067* | (2006.01) |
| *F16D 41/04* | (2006.01) |
| *F16D 28/00* | (2006.01) |
| *F16D 23/12* | (2006.01) |

(52) U.S. Cl.
CPC ........... *F16D 41/067* (2013.01); *F16D 41/04* (2013.01); *F16D 28/00* (2013.01); *F16D 2023/123* (2013.01)

(58) Field of Classification Search
None
See application file for complete search history.

(56) References Cited

U.S. PATENT DOCUMENTS

| 3,528,534 A * | 9/1970 | Benson ................. F16D 41/067 |
| | | 188/82.84 |
| 4,901,831 A | 2/1990 | Ito et al. |
| 5,248,017 A | 9/1993 | Schwarzbich |
| 5,896,973 A | 8/1999 | Hochmuth et al. |
| 6,789,443 B1 * | 9/2004 | Torii ..................... E05F 11/505 |
| | | 192/223.2 |

(Continued)

FOREIGN PATENT DOCUMENTS

| DE | 3834198 | 4/1989 |
| DE | 9101110 | 2/1992 |
| DE | 19581436 | 7/1996 |

(Continued)

*Primary Examiner* — Mark A Manley
(74) *Attorney, Agent, or Firm* — Volpe & Koenig, P.C.

(57) ABSTRACT

A return stop, including a rotating inner ring and a stationary, fixed outer ring, and a cage arranged between the inner ring and the outer ring with multiple roller pairs each having two rollers. At least one spring element is arranged between the two rollers of each roller pair for spring-loading the rollers at least against the outer ring, and on an outer circumferential surface of the inner ring for each roller of each roller pair, a clamping ramp is formed. The outer circumferential surface of the inner ring has at least one cam that is formed radially on the outside and engages in a groove formed on the cage. The at least one cam is smaller in the circumferential direction than the groove. Through a relative movement of the cage relative to the inner ring, the respective roller of each roller pair contacts both the respective clamping ramp and the outer ring. A transfer case for a motor vehicle with such return stop is also provided.

9 Claims, 2 Drawing Sheets

(56) References Cited

U.S. PATENT DOCUMENTS 8,448,764 B2  5/2013  Akiyoshi et al.
2014/0345999 A1* 11/2014  Kitayama ............. F16D 41/088
                                                192/44

FOREIGN PATENT DOCUMENTS

| DE | 19744674 | * | 4/1999 |
| DE | 112008003234 | | 10/2010 |
| JP | 2000257654 | | 9/2000 |

* cited by examiner

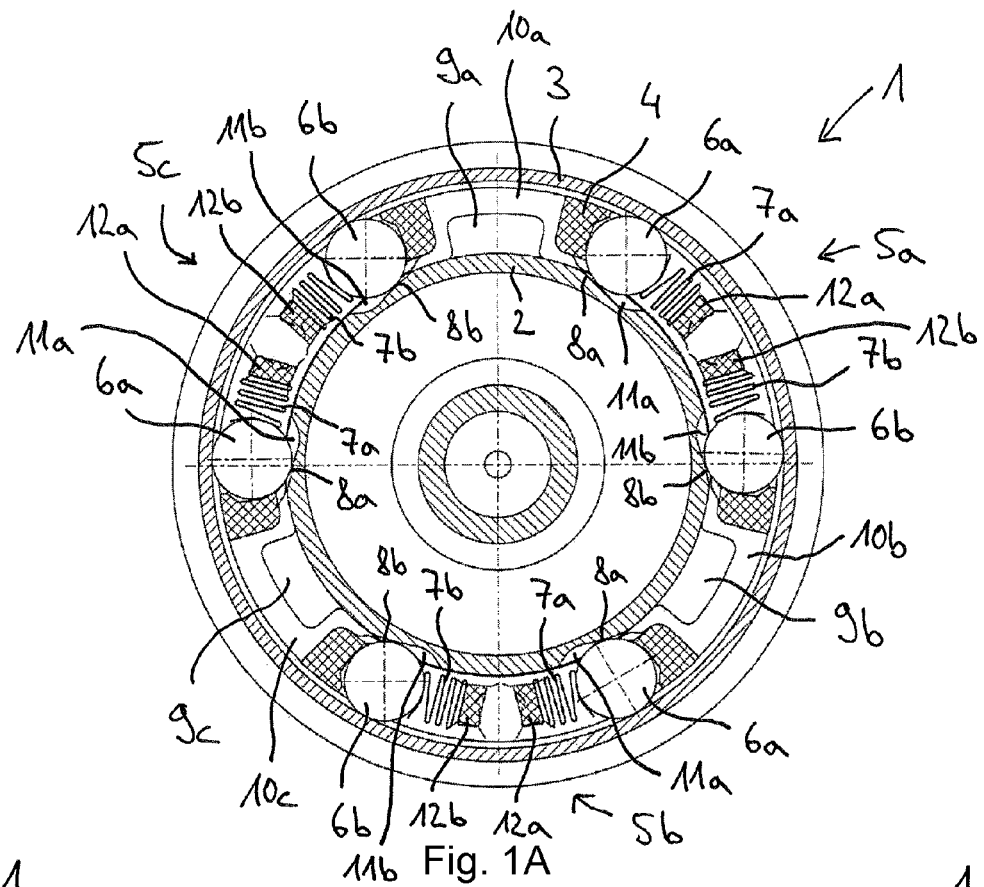
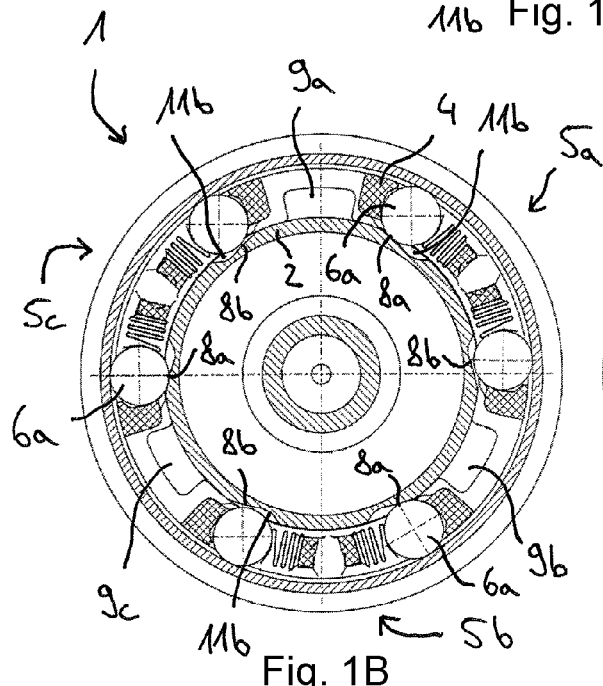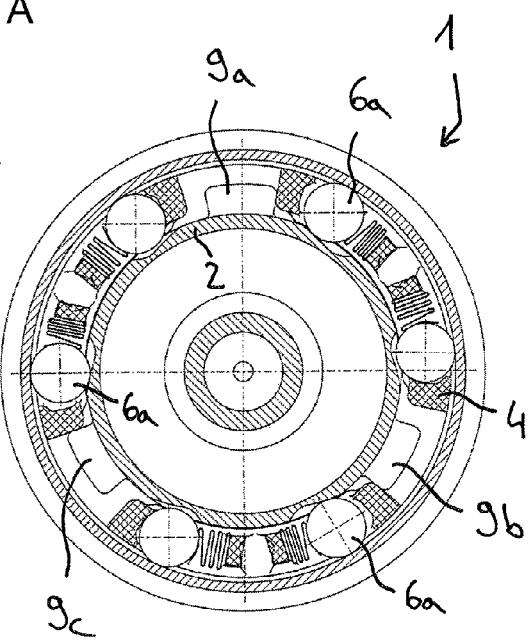
Fig. 1A
Fig. 1B          Fig. 1C

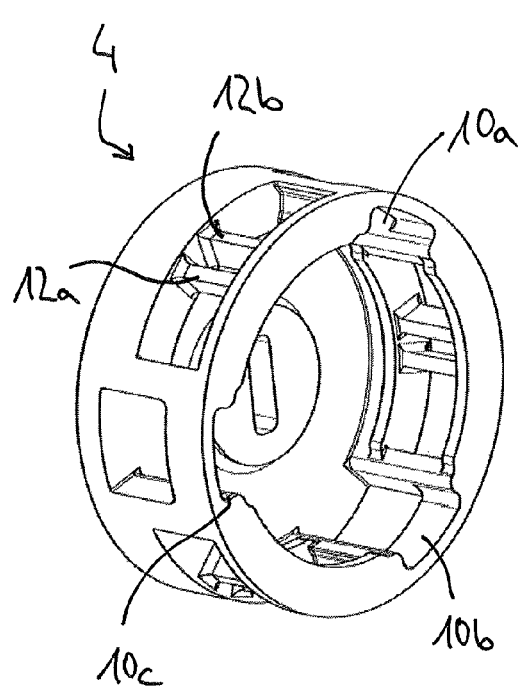
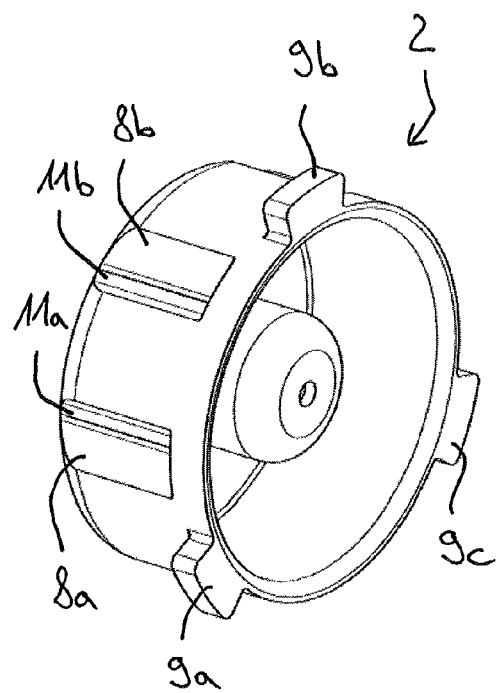
Fig. 2
Fig. 3
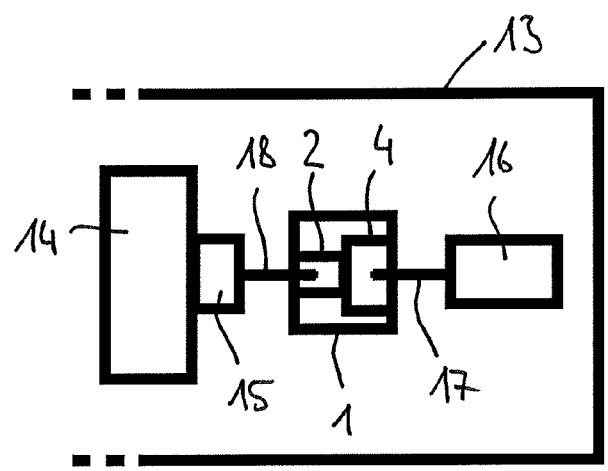
Fig. 4

RETURN STOP AND TRANSFER CASE WITH SUCH A RETURN STOP

INCORPORATION BY REFERENCE

The following documents are incorporated herein by reference as if fully set forth: German Patent Application No. DE 10 2015 201 403.7, filed Jan. 28, 2015.

BACKGROUND

The invention relates to a return stop, comprising a rotating inner ring and a stationary, fixed outer ring, as well as a cage arranged between the inner ring and the outer ring with several roller pairs each consisting of two rollers, wherein at least one spring element is arranged between the two rollers of each roller pair for spring-loading the rollers at least against the outer ring, wherein a clamping ramp is formed on an outer peripheral surface of the inner ring for each roller of the respective roller pair.

The invention further relates to a transfer case for a motor vehicle, wherein this transfer case comprises such a return stop.

From the generally known prior art, transfer cases have become known that are equipped with coupling gear for setting a variable torque. The magnitude of the torque to be transferred by the coupling gear is here dependent on a clamping force of an actuator acting on the coupling gear. Usually the actuator is driven by an electric motor via a worm gear, in order to set the position of the coupling gear and thus the magnitude of the torque. The set position is then held by maintaining the power to the electric motor. One disadvantage is the resulting power consumption. Switching off the electric motor would be accompanied by a loss of the previously set position.

From DE 195 81 436 C1, a clamp-like locking device formed of a housing with an inner cylindrical clamping surface with drive elements and driven elements that can rotate relative to the housing and are arranged coaxial to the cylindrical clamping surface. The driven element is provided with clamping ramps that face the clamping surface and on which there are clamping roller pairs—formed from two clamping rollers following each other in the circumferential direction—whose two clamping rollers are spring-loaded away from each other by means of a spring element arranged between them against the clamping surface and the clamping ramps. Furthermore, the driven element is provided with stops for claws of the drive element, wherein these claws engage between two clamping roller pairs that are adjacent to each other. Here, the claws have, on their sides facing the stops, stops for each clamping roller of a clamping roller pair, wherein a circumferential clearance is formed between the stops and the claws that is greater than a circumferential clearance between the contacts and the clamping rollers. In addition, the driven element has a thin-wall sheet metal part that is drawn radially inward at multiple positions distributed around the circumference through the formation of recesses, wherein walls of the recesses arranged on the circumferential side form the stops and border plateaus provided with the clamping ramps on the circumferential side.

SUMMARY

The object of the present invention is to create an especially reliable, two-sided acting return stop that can be used, in particular, in a transfer case.

This objective is achieved according to the invention in that on the outer circumferential surface of the inner ring there is at least one cam that is formed radially on the outside and engages in a groove formed on the cage, wherein the at least one cam is formed smaller in the circumferential direction than the groove, wherein through a relative movement of the cage relative to the inner ring, the respective roller of each roller pair contacts both the respective clamping ramp and also the outer ring. In other words, an activation of the locking function of the return stop initially requires a positioning of the respective roller of each roller pair on the respective clamping ramp. By each roller coming into contact with the respective clamping ramp and outer ring, each roller is able to trigger a locking of the inner ring in the direction of rotation of the inner ring reverses itself. Due to a symmetric construction and the roller pair, this function applies to both directions of rotation of the return stop. Thus, the return stop features two-sided action.

Advantageously, directly adjacent to each clamping ramp, a radial recess is formed on the inner ring, so that only one roller of each roller pair contacts the inner ring and outer ring at the same time and the other roller of the respective roller pair does not come into contact at least with the inner ring due to the respective radial recess. In this way, simultaneous contact of both rollers of a respective roller pair on the respective clamping ramp and on the outer ring is prevented so that mutual clamping of the rollers can be prevented.

In an especially preferred way, the two clamping ramps of each roller pair are formed pointing away from each other in opposite directions in the circumferential direction. Consequently, only one roller of each roller pair is brought into rotation by rotating the cage on the respective clamping ramp. Advantageously, the two clamping ramps of each roller pair can be formed tapered in opposite directions relative to each other in the circumferential direction.

According to one preferred embodiment, two spring elements are arranged between the two rollers of the respective roller pair, wherein each of the two spring elements is supported on a respective connecting piece formed on the cage. In this way, the respective spring element contacts the respective roller and the respective connecting piece in the circumferential direction. The arrangement of a single spring element that is supported directly on the two rollers is also conceivable, however.

According to another preferred embodiment, three roller pairs are distributed uniformly across the circumference on the cage. Alternatively, however, two roller pairs could also be arranged opposite each other on the cage. For larger loads, the arrangement of more than three roller pairs uniformly across the circumference on the cage is also conceivable.

According to another preferred embodiment, three cams are distributed uniformly across the circumference on the inner ring. Consequently, the cage also has three grooves accordingly. Between every two grooves there is a roller pair. Stop surfaces on which contacting of the cage on the cams is realized when the cage rotates are formed on the circumferential side on the cams and also on the grooves. The formation of only one cam that interacts with a groove is also conceivable. Depending on the size of the torque to be transferred, the number of cams and thus also the number of grooves can vary.

The invention provides that the inner ring and the outer ring are produced at least by a deep-drawing method from a metallic sheet-metal material. Furthermore, other processing steps, such as bending or stamping, are also conceivable. In contrast, the cage is formed from a polymer or a sintered metal, whereby, in particular, a production close to the final shape is possible.

BRIEF DESCRIPTION OF THE DRAWINGS

Features of the invention are explained in more detail below based on the drawings together with the description of preferred embodiments of the invention. In the drawings:

FIG. 1A is a schematic sectional view for illustrating the construction of a return stop according to the invention, comprising an inner ring, an outer ring, and a cage arranged radially in-between, wherein the cage is located in a first position, FIG. 1B is a schematic sectional view for illustrating the construction of the return stop according to the invention from FIG. 1A, wherein the cage is located in a second position, FIG. 1C is a schematic sectional view for illustrating the construction of the return stop according to the invention from FIGS. 1A and 1B, wherein the cage is located in a third position, FIG. 2 is a perspective view for illustrating the cage from FIGS. 1A to 1C, FIG. 3 is a perspective view for illustrating the inner ring from FIGS. 1A to 1C, and FIG. 4 is a schematic view of a section of a transfer case according to the invention with a return stop according to FIG. 1A.

DETAILED DESCRIPTION OF THE PREFERRED EMBODIMENTS

According to FIGS. 1A, 1B, and 1C, a return stop 1 according to the invention has a rotating inner ring 2 and a stationary outer ring 3 that is fixed on a housing—not shown here—and also a cage 4 arranged radially between the inner ring 2 and the outer ring 3. Here, the inner ring 2 and the outer ring 3 are produced in a deep-drawing process from a metallic sheet-metal material. In contrast, the cage 4 is made from a polymer in an injection-molding process. In the cage 4 there are three roller pairs 5a, 5b, 5c distributed uniformly around the circumference of the cage 4. Between the two rollers 6a, 6b of each roller pair 5a, 5b, 5c there are two spring elements 7a, 7b for spring-loading the rollers 6a, 6b, wherein each of the two spring elements 7a, 7b is supported on a respective connecting piece 12a, 12b formed on the cage 4. A clamping ring 8a, 8b is formed on an outer circumferential surface of the inner ring 2 for each roller 6a, 6b of each roller pair 5a, 5b, 5c. The two respective clamping ramps 8a, 8b of each roller pair 5a, 5b are formed pointing away from each other in opposite direction in the circumferential direction.

Furthermore, on the outer circumferential surface of the inner ring 2 there are also three cams 9a, 9b, 9c that are formed radially on the outside and engage in grooves 10a, 10b, 10c formed on the cage 4. The cams 9a, 9b, 9c are formed smaller in the circumferential direction than the grooves 10a, 10b, 10c, so that through a relative movement of the cage 4 relative to the inner ring 2, each roller 6a, 6b of each roller pair 5a, 5b, 5c contacts both the respective clamping ramp 8a, 8b and also an outer ring 3. In addition, directly adjacent to each clamping ramp 8a, 8b there is a radial recess 11a, 11b on the inner ring 2, so that only one roller 6a, 6b of each roller pair 5a, 5b, 5c simultaneously contacts the inner ring 2 and the outer ring 3 and the other roller 6b, 6a of each roller pair 5a, 5b, 5c comes into contact at least not with the inner ring 2 due to the respective radial recess 11b, 11a.

FIG. 1A shows a middle position of the return stop 1. In this position, neither the roller pairs 5a, 5b, 5c contact the inner ring 2, nor the cams 9a, 9b, 9c on the cage 4.

In contrast, FIG. 1B shows a second position of the return stop 1, wherein only the cage 4 was rotated in the counter-clockwise direction. In this way, the respective rollers 6a contact the respective clamping ramp 8a and trigger a blocking function for an undesired reversal of the direction of rotation. The respective rollers 6b are held on the cage 4 such that contact on the respective clamping ramp 8b is reliably prevented. Furthermore, here the respective radial recess 11b also makes a contribution.

According to FIG. 1C, the return stop is located in a third position. The cage 4 contacts the cams 9a, 9b, 9c on the circumferential side and allows the inner ring 2 to be carried along. Through the respective rollers 6a, the freewheeling operation is realized. An undesired reversal in the direction of rotation of the inner ring 2 would cause a blocking of the return stop by means of the respective rollers 6a.

FIG. 2 shows a perspective view of the cage 4. In this view, the grooves 10a, 10b, 10c and the connecting pieces 12a, 12b formed on the cage 4 can be seen particularly well.

FIG. 3 shows a perspective view of the inner ring 2. The inner ring 2 is formed according to this preferred embodiment with a cup-shaped design. In this view, the clamping ramps 8a, 8b with the associated radial recesses 11a, 11b and the cams 9a, 9b, 9c can be seen particularly well.

According to FIG. 4, a transfer case 13 according to the invention in a motor vehicle—not shown here—has a coupling unit 14, an actuator 15, an electric motor 16, and also the return stop 1 described above. The electric motor 16 here drives the cage 4 of the return stop 1 via a drive shaft 17. The cage 4 transfers the rotational movement as described above to the inner ring 2, which is in turn connected to a driven shaft 18. The actuator 15 controlling the coupling unit 14 is connected to the return stop 1 via the driven shaft 18.

LIST OF REFERENCE SYMBOLS

1 Return stop
2 Inner ring
3 Outer ring
4 Cage
5a-5c Roller pair
6a, 6b Roller
7a, 7b Spring element
8a, 8b Clamping ramp
9a-9c Cam
10a-10c Groove
11a, 11b Radial recess
12a, 12b Connecting piece
13 Transfer case
14 Coupling unit
15 Actuator
16 Electric motor
17 Drive shaft
18 Driven shaft

The invention claimed is:

1. A return stop, comprising a rotating inner ring and a stationary, fixed outer ring, a cage arranged between the inner ring and the outer ring with multiple roller pairs each having two rollers, at least one spring element arranged between the two rollers of each of the roller pairs for spring-loading the rollers at least against the outer ring, a clamping ramp formed on an outer circumferential surface of the inner ring for each of the rollers of each of the roller pairs, and on the outer circumferential surface of the inner ring, at least one cam formed radially on an outside that engages in a groove formed on the cage, the at least one cam is formed smaller in a circumferential direction than the groove, and through relative movement of the cage relative to the inner ring, the respective roller of each of the roller pairs contacts both the respective clamping ramp and the outer ring, wherein directly adjacent to each of the clamping ramps, separate radial recesses are formed on the inner ring such that the inner ring includes a same number of clamping ramps and radial recesses, and wherein only one of the rollers of each of the roller pairs contacts the inner ring and the outer ring at a same time and the other of the rollers of each of the roller pairs does not contact at least the inner ring due to the respective radial recess.

2. The return stop according to claim 1, wherein the two clamping ramps of each of the roller pairs are formed pointing away from each other in opposite direction in the circumferential direction.

3. The return stop according to claim 1, further comprising two spring elements arranged between the two of the rollers of each of the roller pairs, each of the two spring elements is supported on a respective connecting piece formed on the cage.

4. The return stop according to claim 1, wherein three of the roller pairs are distributed uniformly across the circumference on the cage.

5. The return stop according to claim 1, further comprising three cams are distributed uniformly across the circumference on the inner ring.

6. The return stop according to claim 1, wherein the inner ring and the outer ring are deep drawn from a metallic sheet-metal material.

7. A transfer case for a motor vehicle, comprising a coupling unit for transmitting a variable torque, the coupling unit being operably connected to an actuator, the actuator being controllable at least indirectly by an electric motor, and a return stop according to claim 1 arranged between the electric motor and the actuator.

8. The transfer case according to claim 7, wherein the electric motor is actively connected by a drive shaft to the cage of the return stop.

9. The transfer case according to claim 8, wherein the actuator is actively connected by a driven shaft to the inner ring of the return stop.

* * * * *